United States Patent [19]
Nakamura et al.

[11] Patent Number: 5,901,256
[45] Date of Patent: May 4, 1999

[54] LASER BEAM SCANNING DEVICE AND APPARATUS PROVIDED WITH A LASER BEAM SCANNING DEVICE

[75] Inventors: Hiromu Nakamura; Satoru Ono, both of Toyokawa, Japan

[73] Assignee: Minolta Co., Ltd., Osaka, Japan

[21] Appl. No.: 08/568,758

[22] Filed: Dec. 7, 1995

[30] Foreign Application Priority Data

Dec. 9, 1994 [JP] Japan .................................. 6-305843

[51] Int. Cl.⁶ ............................. G06K 7/00; G02B 26/08
[52] U.S. Cl. ........................... 382/312; 359/208; 359/217
[58] Field of Search ................................... 359/852, 867, 359/868, 869, 208, 217, 710, 858, 216; 347/256, 260; 382/312

[56] References Cited

U.S. PATENT DOCUMENTS

| | | | |
|---|---|---|---|
| 4,893,003 | 1/1990 | Hays | 359/867 |
| 5,142,403 | 8/1992 | Ossman | 359/216 |
| 5,373,390 | 12/1994 | Sakuma | 359/208 |
| 5,583,559 | 12/1996 | Nakamura et al. | 359/208 |

FOREIGN PATENT DOCUMENTS

| | | | |
|---|---|---|---|
| 6-281872 | 10/1994 | Japan | G02B 26/10 |
| 1399701 | 7/1975 | United Kingdom | G02B 17/00 |

*Primary Examiner*—David K. Moore
*Assistant Examiner*—Wenpeng Chen
*Attorney, Agent, or Firm*—Burns, Doane, Swecker & Mathis, LLP

[57] ABSTRACT

A laser beam scanning device which has an improved cylindrical mirror in an optical path from a laser source unit to a polygonal mirror. The cylindrical mirror has a finite radius of curvature only in a sub scanning direction, and the radius of curvature in the sub scanning direction varies in a main scanning direction such that the closer to a laser beam incident side, the larger and the closer to a laser beam emergent side, the smaller. The laser beam reflected by the cylindrical mirror is converged on a line substantially parallel to each reflective facet of the polygonal mirror.

10 Claims, 5 Drawing Sheets

LASER BEAM SCANNING DEVICE AND APPARATUS PROVIDED WITH A LASER BEAM SCANNING DEVICE

BACKGROUND OF THE INVENTION

1. Field of the Invention

The present invention relates to an apparatus using a laser beam, and more particularly to an apparatus, such as a laser beam printer, a facsimile, a copying machine, a display or the like, provided with a scanning device which scans a laser beam emitted from a laser source in a main scanning direction on a scanning surface in order to read, print or display an image. The present invention also relates to a scanning device which is provided in a laser beam printer, a facsimile, a copying machine, a display or the like to scan a laser beam emitted from a laser source on a scanning surface.

2. Description of Related Art

Recently, various kinds of laser beam scanning devices have been developed as an image reader, an image printer or an image projector of a laser printer, a facsimile, a copying machine, a display or the like. Such an image printer generally comprises a light source which is modulated in accordance with image data, a polygonal mirror which scans a laser beam emitted from the light source in a main scanning direction at a constant angular velocity, and an fθ system which adjusts the scanning speed in the main scanning direction. U.K. Patent No. 1,399,701 discloses that a cylindrical lens is provided between the light source and the polygonal mirror to converge a laser beam emitted from the light source on each reflective facet of the polygonal mirror in a sub scanning direction perpendicular to the main scanning direction. By converging the laser beam on each of the reflective facets of the polygonal mirror, a conjugate relationship is made between the reflective facets of the polygonal mirror and a scanning surface. Thereby, banding due to errors in the perpendicularity of the reflective facets can be prevented.

It is also well known to provide a plane mirror 30 between the light source and the cylindrical lens 31 as shown in FIG. 5. A laser beam Lb is deflected by the plane mirror 30, and the system from the light source to the polygonal mirror can be downsized. In FIG. 5, the line A indicates a converging line on which the laser beam is converged by the cylindrical lens 31.

The cylindrical lens 31 may be made of resin. Making the cylindrical lens 31 of resin has an advantage that mass production is possible only by preparing an accurate mold, thereby decreasing the cost. However, the refractive index of a resin lens changes with a change in temperature or in humidity, which causes a change in the focal length of the system. Consequently, defocus is caused, which brings about problems that the beam waist on the scanning surface becomes large and that the effect of rectifying errors in the perpendicularity of the reflective facets of the polygonal mirror is weakened.

In order to avoid these problems, it is possible to provide a mirror instead of the cylindrical lens as an element for converging the laser beam. However, in this case, the following problems occur. If a cylindrical mirror 32 is provided in the position of the plane mirror 30 as shown in FIG. 6, the converging line A will slant with respect to each reflective facet of the polygonal mirror, thereby causing defocus. This problem can be avoided by changing the relative positions of the cylindrical mirror 32 and the polygonal mirror, by providing a half mirror 33 after the cylindrical mirror 32 as shown in FIG. 7 or by constructing a three-dimensional optical path from the light source to the polygonal mirror as shown in FIG. 8 to make an angle in the sub scanning direction between an incident beam to the cylindrical mirror 32 and an emergent beam therefrom. However, either of the cases requires a large change to the arrangement of optical elements.

SUMMARY OF THE INVENTION

It is an object of the present invention to provide a laser beam scanning device which has a reduced number of optical elements arranged basically in a conventional manner.

Another object of the present invention is to provide an apparatus provided with a laser beam scanning device which has a reduced number of optical elements arranged basically in a conventional manner.

Another object of the present invention is to provide a laser beam scanning device which can rectify errors in the perpendicularity of reflective facets of a scanner without increasing the number of optical elements.

Further, another object of the present invention is to provide an apparatus provided with a laser beam scanning device which can rectify errors in the perpendicularity of reflective facets of a scanner without increasing the number of optical elements.

In order to attain the objects, a laser beam scanning device according to the present invention has a reflective optical element for rectifying errors in the perpendicularity of reflective facets of a scanner, the reflective optical element having a finite radius of curvature only in a sub scanning direction. Further, this radius of curvature varies along the main scanning direction to be larger in the laser beam incident side and smaller in the laser beam emergent side.

The converging point (focal length) of the reflective optical element varies in proportion to the radius of curvature. More specifically, a laser beam reflected on a point which has a larger radius of curvature converges on a further point, and a laser beam reflected on a point which has a smaller radius of curvature converges on a closer point. Accordingly, the laser beam reflected by the reflective optical element converges on a line which is substantially parallel to the reflective facets of the scanner, which results in good beam convergence on a scanning surface.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

A preferred embodiment of the present invention is described with reference to the accompanying drawings. In the embodiment, the present invention is applied to a laser beam printer.

Figure 1:
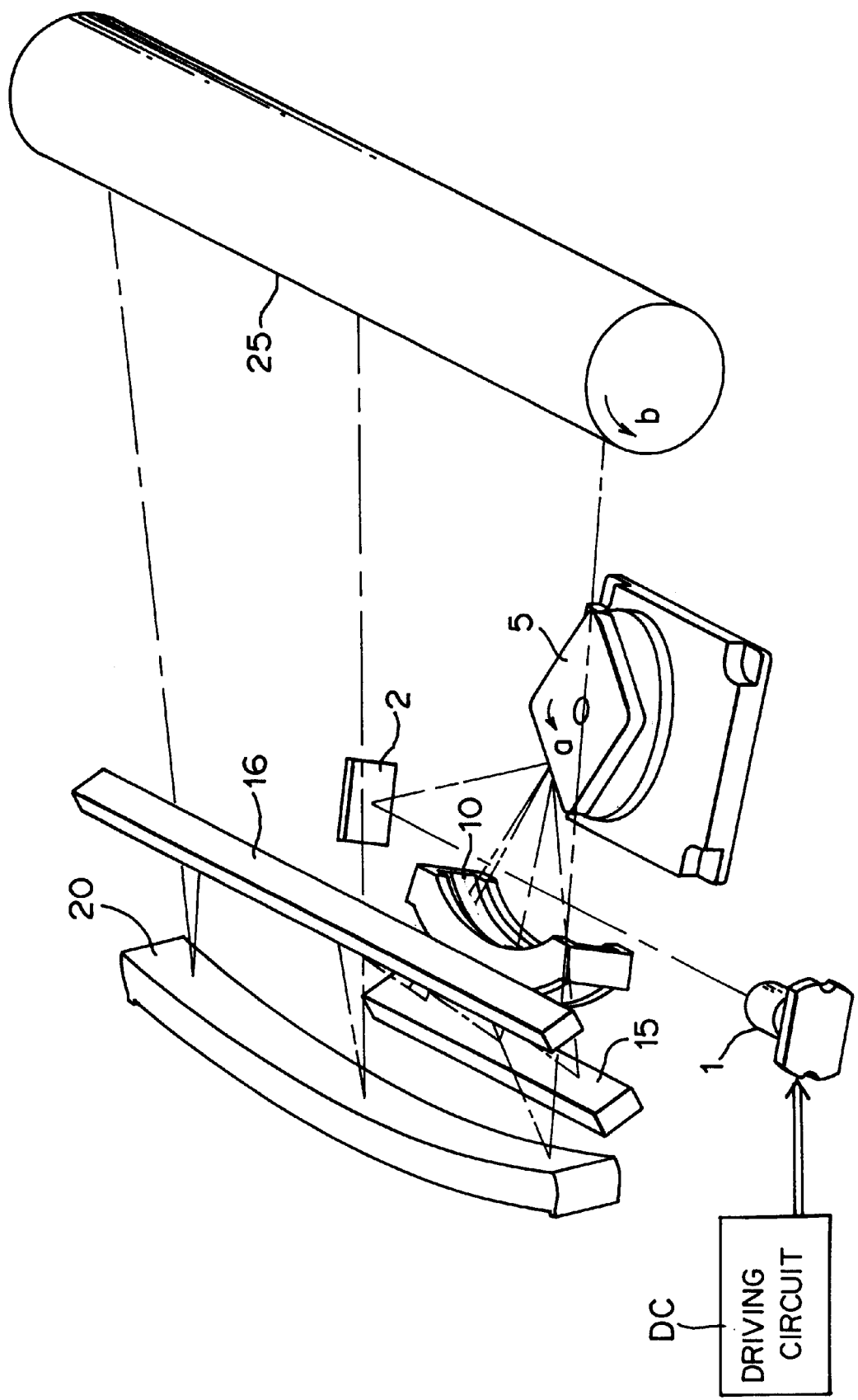
FIG. 1 is a perspective view of a laser beam scanning device which is an embodiment of the present invention.

As shown in FIG. 1, a laser beam scanning device according to the present invention comprises a light source unit 1, an improved cylindrical mirror 2, a polygonal mirror 5, a toric lens 10, plane mirrors 15 and 16, and an fθ mirror 20.

The light source unit 1 comprises a laser diode and a collimator lens. The laser diode is modulated (turned on and off) in accordance with image data inputted in a driving circuit DC, and emits a laser beam when it is on. The laser beam is converged by the collimator lens to be made into a substantially parallel light. Then, the laser beam is reflected by the cylindrical mirror 2, and thereby, the beam spot is changed into a linear form extending in a main scanning direction. The laser beam with a linear beam spot is incident to the polygonal mirror 5.

The polygonal mirror 5 has four reflective facets on the peripheral surfaces and is driven to rotate in a direction indicated by arrow a at a constant speed. With the rotation of the polygonal mirror 5, the laser beam is scanned in a plane perpendicular to the rotation axis of the polygonal mirror 5 at a constant angular velocity, and this is referred to as main scanning. Then, the scanned beam is guided to the toric lens 10.

The toric lens 10 has different powers in the main scanning direction and in a sub scanning direction perpendicular to the main scanning direction. The toric lens 10 has such a power in the sub scanning direction as to converge the laser beam on a scanning surface (photosensitive drum 25), and because of this function of the toric lens 10, a conjugation relationship can be kept between the reflective facets of the polygonal mirror 5 and the scanning surface. In this way, the toric lens 10 rectifies errors in the perpendicularity of the reflective facets of the polygonal mirror 5 in cooperation with the cylindrical mirror 2.

After passing through the toric lens 10, the laser beam is reflected by the plane mirrors 15 and 16, and further reflected by the fθ mirror 20. Then, the laser beam is converged on a photosensitive drum 25. The speed of the main scanning carried out by the polygonal mirror 5 varies on the photosensitive drum 25 from portion to portion. The fθ mirror 20 is to keep a constant main scanning speed on the photosensitive drum 25. In other words, the fθ mirror 20 corrects distortion. The photosensitive drum 25 is driven to rotate in a direction indicated by arrow b at a constant speed, and the rotation results in sub scanning. An image is formed on the photosensitive drum 25 by the main scanning and the sub scanning.

Figure 2:
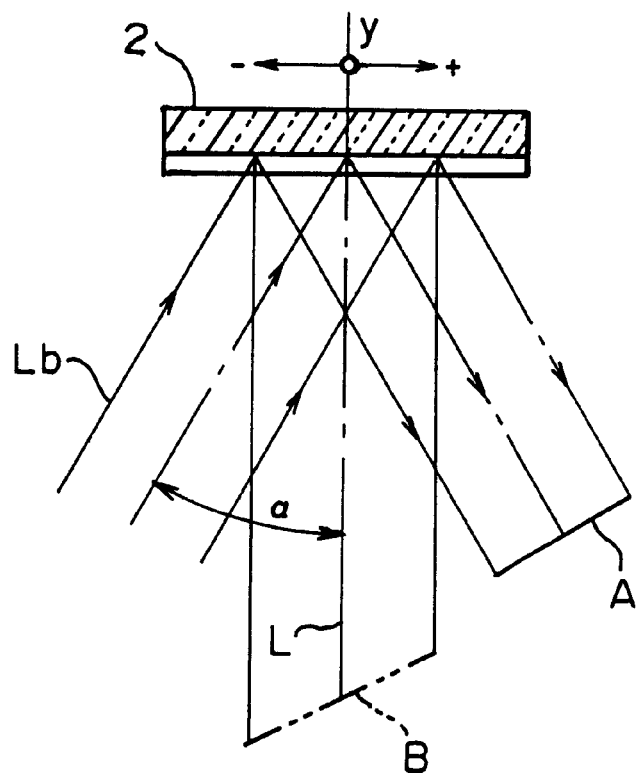
FIG. 2 is an illustration showing the light converging function of an improved cylindrical mirror provided in the device of FIG. 1, the illustration being a sectional view taken in a main scanning direction.
Figure 3:
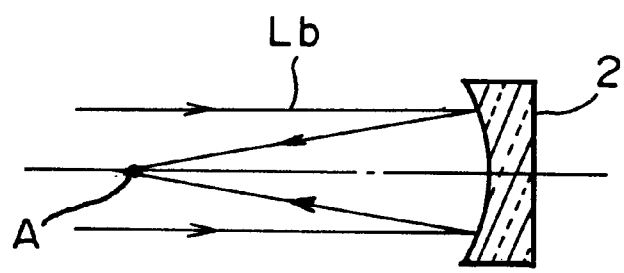
FIG. 3 is an illustration showing the light converging function of the improved cylindrical mirror, the illustration being a sectional view taken in a sub scanning direction.
Figure 4:
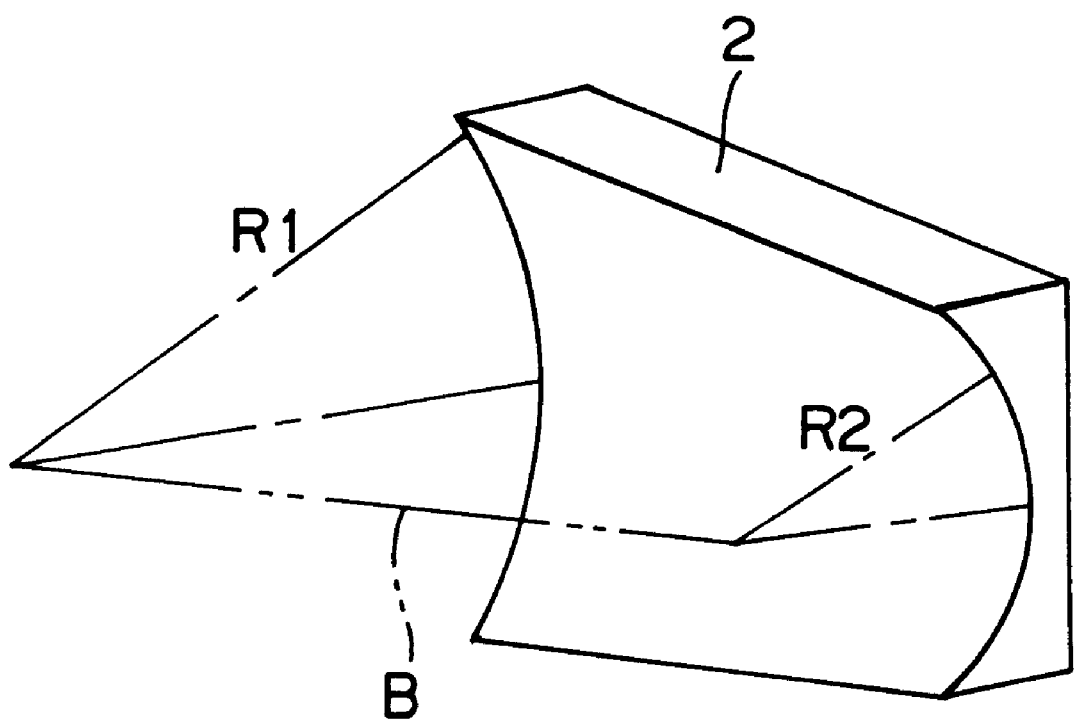
FIG. 4 is an illustration showing the light converging function of the improved cylindrical mirror, the illustration being a perspective view.
Figure 5:
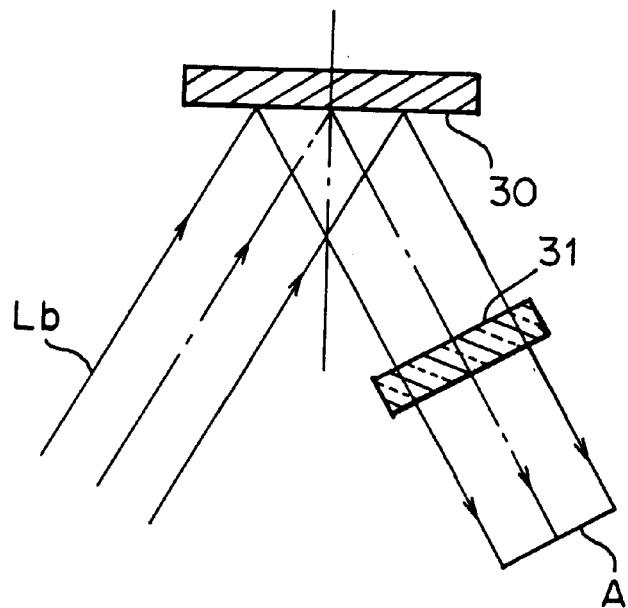
FIG. 5 is an illustration showing the light converging function of a cylindrical lens provided in a conventional laser beam scanning device.
Figure 6:
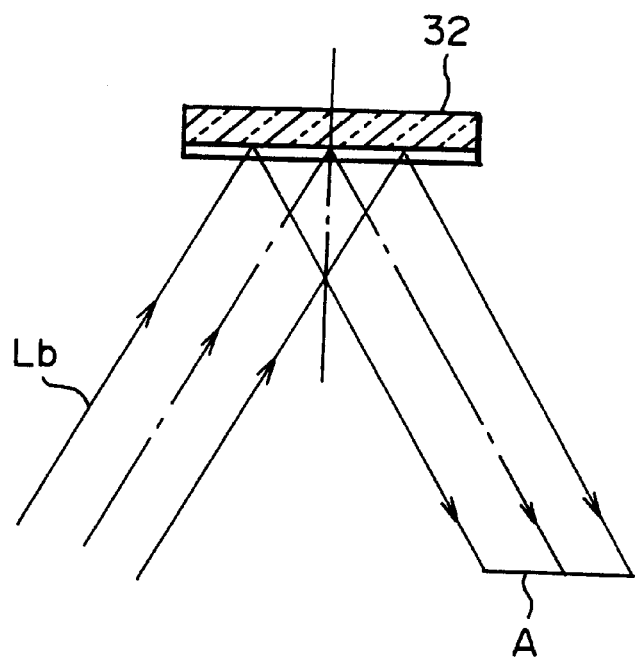
FIG. 6 is an illustration showing the light converging function of a cylindrical mirror provided in a conventional laser beam scanning device.

Now referring to FIGS. 2, 3 and 4, the cylindrical mirror 2 is described. In this embodiment, the cylindrical mirror 2 is produced by injection molding of resin. The cylindrical mirror 2 has a finite radius of curvature in the sub scanning direction and accordingly a focal length only in the sub scanning direction. This radius of curvature (and the focal length) varies in the main scanning direction. More specifically, the closer to the beam incident side (left side in FIGS. 2 and 4), the larger the radius of curvature is, and the closer to the beam emergent side (right side in FIGS. 2 and 4), the smaller the radius of curvature is (R1>R2).

The focal length in the sub scanning direction f(y) of the cylindrical mirror 2 is determined as follows:

$$f(\alpha,y)=f_o-y\sin\alpha$$

α: incident angle of the laser beam
y: coordinate in the main scanning direction on the mirror surface
$f_o$: focal length at a point y=0
For example, when α=30° and $f_o$=30 mm, $$f(y) = 30 - y\sin 30$$
$$= 30 - 0.5y$$

In this case, the focal length at a point y=5 (f(5)) is 27.5 mm, and the radius of curvature at the point is 55 mm. The focal length at a point y=−5 (f(−5)) is 32.5 mm, and the radius of curvature at this point is 65 mm.

Figure 7:
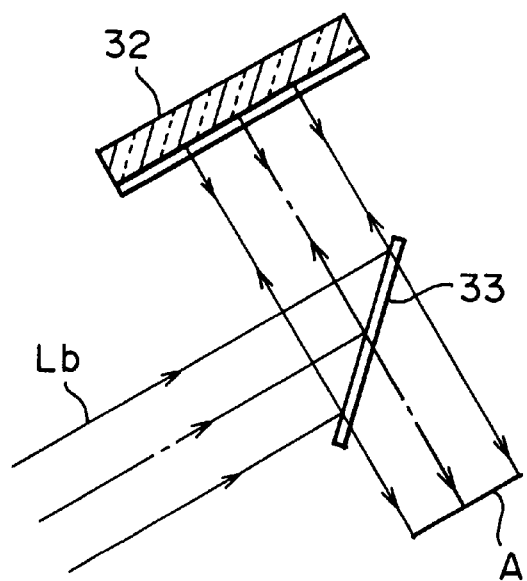
FIG. 7 is an illustration showing the light converging function of the cylindrical mirror of FIG. 6 when a half mirror is further provided.
Figure 8:
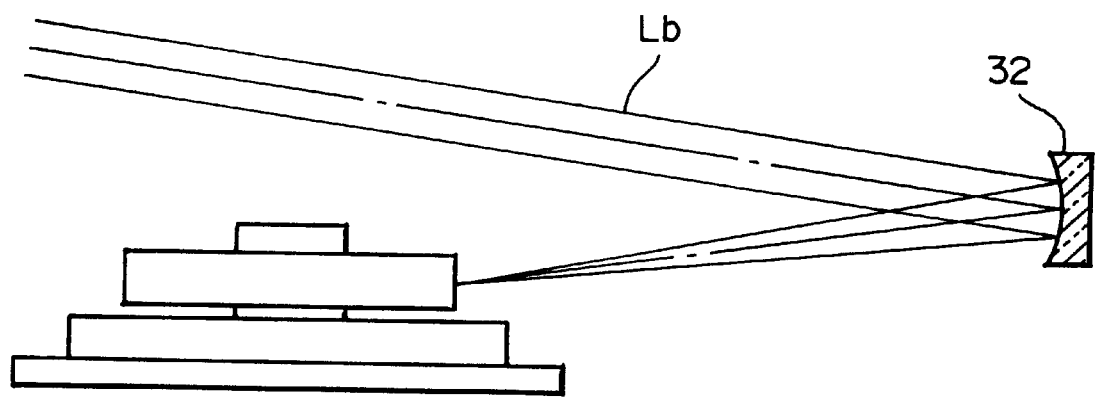
FIG. 8 is an illustration of an optical system of a three-dimensional structure with a cylindrical mirror.

The line B in FIG. 2 indicates centers of curvature of the mirror surface, and as is apparent from the line B, the closer to the beam incident side, the larger the radius of curvature is, and the closer to the beam emergent side, the smaller the radius of curvature is. The converging point of the laser beam Lb by the mirror 2 is farther from the mirror surface in proportion as the radius of curvature becomes larger, and the converging line A is formed to be substantially parallel to the reflective facets of the polygonal mirror 5, which results in good beam convergence on the photosensitive drum 25. The cylindrical mirror 2 is made of resin, and it is easy and inexpensive to mass-produce mirrors with an aspherical surface out of resin. Further, this resin optical element is a reflective element (mirror), not a transmitting element (lens), and there is not a problem that the refractive index of the resin optical element changes with a change in temperature and/or a change in humidity. Therefore, defocus due to the change in the refractive index of the resin optical element does not occur. Additionally, although this resin optical element is a reflective element, it is necessary neither to provide a half mirror 33 in the optical path as shown in FIGS. 7 nor to construct the optical path from the light source unit 1 to the polygonal mirror 5 to be three-dimensional as shown in FIG. 8.

Other kinds of optical elements can be used to construct the optical path, and the arrangement of the optical elements is arbitrary.

The present invention is applicable not only to an image printer but also to an image reader and an image projector, as long as it is an optical system which is not rotation-symmetrical with respect to the optical axis.

Although the present invention has been described in connection with the preferred embodiment, it is to be noted that various changes and modifications are possible to those who are skilled in the art. Such changes and modifications are to be understood as being within the scope of the present invention.

What is claimed is:

1. An apparatus comprising:
   a laser source;

a reflective optical element upon which a laser beam emitted from the laser source is incident at a specified incident angle, the reflective optical element reflecting the laser beam in a direction away from the laser source; and a scanner which is located in a position to receive the laser beam reflected by the reflective optical element and which scans in a main scanning plane;

wherein the reflective optical element has a focal length varying along a main scanning direction parallel to said main scanning plane such that the focal length is longer when closer to a beam incident side, and shorter when closer to a beam emergent side.

2. An apparatus as claimed in claim 1, wherein the focal length of the reflective optical element varies only along the main scanning direction.

3. An apparatus as claimed in claim 1, wherein the reflective optical element is made of resin.

4. An apparatus as claimed in claim 1, further comprising a sub scanner for scanning the laser beam on the sub scanner in a sub scanning direction perpendicular to said main scanning plane.

5. An apparatus as claimed in claim 4, wherein the sub scanner is a photosensitive drum.

6. A scanning device comprising:

a reflective optical element upon which a laser beam emitted from a laser source is incident at a specified incident angle, the reflective optical element reflecting the laser beam in a direction away from the laser source; and a scanner which is located in a position to receive the laser beam reflected by the reflective optical element and which scans the laser beam in a main scanning plane;

wherein the reflective optical element has a focal length varying along a main scanning direction parallel to said main scanning plane such that the focal length is longer when closer to a beam incident side, and shorter when closer to a beam emergent side.

7. A scanning device as claimed in claim 6, wherein the focal length of the reflective optical element varies only along the main scanning direction.

8. A scanning device as claimed in claim 6, wherein the reflective optical element is made of resin.

9. A scanning device as claimed in claim 6, further comprising a sub scanner for scanning the laser beam on the sub scanner in a sub scanning direction perpendicular to said main scanning plane.

10. A scanning device as claimed in claim 9, wherein the sub scanner is a photosensitive drum.

* * * * *